United States Patent
Parikh et al.

(10) Patent No.: US 9,473,567 B2
(45) Date of Patent: Oct. 18, 2016

(54) VIRTUAL ZONES FOR OPEN SYSTEMS INTERCONNECTION LAYER 4 THROUGH LAYER 7 SERVICES IN A CLOUD COMPUTING SYSTEM

(71) Applicant: AT&T Intellectual Property I, L.P., Atlanta, GA (US)

(72) Inventors: Anisa Parikh, Holmdel, NJ (US); Neela R. Atluri, Marlboro, NJ (US); Paritosh Bajpay, Edison, NJ (US); Sekar Ganesan, Ocean, NJ (US); Shobhna Goyal, Marlboro, NJ (US); Shiv Kumar, Marlboro, NJ (US); Magda K. Nassar, Tinton Falls, NJ (US); Satyendra Tripathi, E Brunswick, NJ (US); Ralph Utano, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 109 days.

(21) Appl. No.: 14/464,241

(22) Filed: Aug. 20, 2014

(65) Prior Publication Data

US 2016/0057208 A1    Feb. 25, 2016

(51) Int. Cl.
*G06F 11/00* (2006.01)
*H04L 29/08* (2006.01)
*G06F 11/20* (2006.01)

(52) U.S. Cl.
CPC ............ *H04L 67/10* (2013.01); *G06F 11/203* (2013.01); *H04L 67/1097* (2013.01); *G06F 2201/815* (2013.01)

(58) Field of Classification Search
CPC .................................................. G06F 11/203
USPC ................. 714/4.2, 4.1, 4.11, 4.12, 4.3, 4.21
See application file for complete search history.

(56) References Cited

U.S. PATENT DOCUMENTS

| | | |
|---|---|---|
| 7,466,710 B1 | 12/2008 | Clemm et al. |
| 7,574,496 B2 | 8/2009 | Mccrory et al. |
| 7,603,671 B2 | 10/2009 | Liu |
| 7,818,002 B2 | 10/2010 | Bajko et al. |
| 7,869,364 B2 | 1/2011 | Griffith et al. |
| 8,032,413 B2* | 10/2011 | Carlson ............... G06Q 20/202 705/14.49 |

(Continued)

OTHER PUBLICATIONS

Binz, Tobias, et al. "Portable Cloud Services Using TOSCA." IEEE Internet Computing 16.3 (2012).

(Continued)

*Primary Examiner* — Dieu-Minh Le
(74) *Attorney, Agent, or Firm* — Hartman & Citrin LLC (57) ABSTRACT

Concepts and technologies disclosed herein are directed to virtual zones for Open Systems Interconnection ("OSI") communication model layers 4-7 services in a cloud computing system. According to one aspect of the concepts and technologies disclosed herein, a cloud computing system can include a hardware resource and a virtual zone. The virtual zone can include a virtual network function ("VNF") that is executable by the hardware resource. The VNF can support a service that operates within one of layers 4-7 of the OSI communication model. A computing system can detect new subscribers to the service within the virtual zone. The computing system also can determine that a capacity constraint exists within the virtual zone as a result of the new subscribers. The computing system also can home the new subscribers to the further virtual zone so that the further VNF can provide the service to the new subscribers.

20 Claims, 7 Drawing Sheets

(56) References Cited

U.S. PATENT DOCUMENTS

| | | | |
|---|---|---|---|
| 8,190,740 B2 | 5/2012 | Stienhans et al. |
| 8,209,415 B2 | 6/2012 | Wei |
| 8,218,557 B2 | 7/2012 | Kean et al. |
| 8,244,559 B2 | 8/2012 | Horvitz et al. |
| 8,250,215 B2 | 8/2012 | Stienhans et al. |
| 8,271,653 B2 | 9/2012 | Dehaan |
| 8,276,140 B1 | 9/2012 | Beda et al. |
| 8,433,802 B2 | 4/2013 | Head et al. |
| 8,514,868 B2 | 8/2013 | Hill |
| 8,515,433 B2 | 8/2013 | Vaswani et al. |
| 8,572,612 B2 | 10/2013 | Kern |
| 8,606,878 B2 | 12/2013 | Ferris |
| 8,615,746 B2 | 12/2013 | Blainey et al. |
| 8,656,019 B2 | 2/2014 | Chikando et al. |
| 8,700,946 B2 | 4/2014 | Reddy et al. |
| 8,724,620 B2 | 5/2014 | Ku et al. |
| 8,739,157 B2 | 5/2014 | Ho et al. |
| 8,959,484 B2 | 2/2015 | Pinnix |
| 2005/0176428 A1 | 8/2005 | Gabor et al. |
| 2006/0146792 A1 | 7/2006 | Rmachandran |
| 2007/0036151 A1 | 2/2007 | Baeder |
| 2007/0106769 A1* | 5/2007 | Liu ............... G06F 9/455 709/223 |
| 2008/0025221 A1 | 1/2008 | Lipps |
| 2008/0254795 A1 | 10/2008 | Ratcliffe |
| 2009/0067409 A1 | 3/2009 | Ku |
| 2009/0097398 A1 | 4/2009 | Belinchon Vergara et al. |
| 2009/0116505 A1 | 5/2009 | Bhatia et al. |
| 2009/0300210 A1 | 12/2009 | Ferris |
| 2010/0136970 A1 | 6/2010 | Mui et al. |
| 2010/0274680 A1* | 10/2010 | Carlson ............ G06Q 20/10 705/26.1 |
| 2010/0296443 A1 | 11/2010 | Hirano et al. |
| 2011/0093584 A1 | 4/2011 | Qiu et al. |
| 2011/0117888 A1 | 5/2011 | Klein et al. |
| 2011/0119312 A1 | 5/2011 | Chopra et al. |
| 2011/0119729 A1 | 5/2011 | Bergeson et al. |
| 2011/0126168 A1 | 5/2011 | Ilyayev |
| 2011/0145836 A1 | 6/2011 | Wheeler et al. |
| 2011/0252420 A1 | 10/2011 | Tung et al. |
| 2011/0295996 A1 | 12/2011 | Qiu et al. |
| 2012/0011077 A1 | 1/2012 | Bhagat |
| 2012/0072581 A1 | 3/2012 | Tung et al. |
| 2012/0096045 A1 | 4/2012 | Moore et al. |
| 2012/0102183 A1 | 4/2012 | Murakami et al. |
| 2012/0131591 A1 | 5/2012 | Moorthi et al. |
| 2012/0158921 A1 | 6/2012 | Asveren et al. |
| 2012/0203823 A1 | 8/2012 | Manglik et al. |
| 2012/0281706 A1 | 11/2012 | Agarwal et al. |
| 2012/0297059 A1 | 11/2012 | Bross |
| 2012/0300615 A1 | 11/2012 | Kempf et al. |
| 2012/0311154 A1 | 12/2012 | Morgan |
| 2013/0031550 A1 | 1/2013 | Choudhury et al. |
| 2013/0054670 A1* | 2/2013 | Keyes ............ G06F 19/3481 709/201 |
| 2013/0091284 A1 | 4/2013 | Rothschild |
| 2013/0091285 A1 | 4/2013 | Devarakonda et al. |
| 2013/0124401 A1 | 5/2013 | Del |
| 2013/0124712 A1 | 5/2013 | Parker |
| 2013/0145367 A1 | 6/2013 | Moss et al. |
| 2013/0182702 A1 | 7/2013 | Ku |
| 2013/0188489 A1 | 7/2013 | Sato |
| 2013/0227673 A1 | 8/2013 | Yoon |
| 2013/0268913 A1 | 10/2013 | Anderson et al. |
| 2013/0286861 A1 | 10/2013 | Smith et al. |
| 2013/0291052 A1 | 10/2013 | Hadar et al. |
| 2013/0303114 A1 | 11/2013 | Ahmad et al. |
| 2013/0304904 A1 | 11/2013 | Mouline et al. |
| 2013/0311778 A1 | 11/2013 | Cherukuri et al. |
| 2013/0326036 A1 | 12/2013 | Heumesser et al. |
| 2013/0344897 A1 | 12/2013 | Pierce, II et al. |
| 2014/0010084 A1 | 1/2014 | Kavunder et al. |
| 2014/0032850 A1 | 1/2014 | Phelan et al. |
| 2014/0033268 A1 | 1/2014 | Julisch et al. |
| 2014/0059226 A1 | 2/2014 | Messerli et al. |
| 2014/0068611 A1 | 3/2014 | McGrath et al. |
| 2014/0068703 A1 | 3/2014 | Balus et al. |
| 2014/0074973 A1 | 3/2014 | Kumar et al. |
| 2014/0082699 A1 | 3/2014 | Eicken et al. |
| 2014/0086177 A1 | 3/2014 | Adjakple et al. |
| 2014/0109188 A1 | 4/2014 | Pavlov et al. |
| 2014/0112139 A1 | 4/2014 | Allan et al. |
| 2014/0115578 A1 | 4/2014 | Cooper et al. |
| 2014/0115583 A1 | 4/2014 | Lee et al. |
| 2014/0123129 A1 | 5/2014 | Risbood et al. |
| 2014/0130038 A1 | 5/2014 | Lucovsky et al. |
| 2014/0146673 A1 | 5/2014 | Parker |
| 2014/0149485 A1 | 5/2014 | Sharma et al. |
| 2014/0149492 A1 | 5/2014 | Ananthanarayanan et al. |
| 2014/0156850 A1 | 6/2014 | Hunt |
| 2014/0189109 A1* | 7/2014 | Jang ............ H04L 67/10 709/224 |
| 2014/0201374 A1 | 7/2014 | Ashwood-Smith |
| 2014/0279201 A1 | 9/2014 | Iyoob et al. |
| 2014/0280848 A1 | 9/2014 | Modh et al. |
| 2014/0280918 A1 | 9/2014 | Grandhe et al. |
| 2014/0280964 A1 | 9/2014 | Farooq et al. |
| 2014/0280966 A1 | 9/2014 | Sapuram et al. |
| 2014/0282037 A1 | 9/2014 | Narasimhan et al. |
| 2014/0282525 A1 | 9/2014 | Sapuram et al. |
| 2014/0282536 A1 | 9/2014 | Dave et al. |
| 2014/0317166 A1 | 10/2014 | Iyoob et al. |
| 2014/0317293 A1 | 10/2014 | Shatzkamer |
| 2015/0007169 A1 | 1/2015 | Li et al. |
| 2015/0033365 A1 | 1/2015 | Mellor et al. |
| 2015/0063166 A1 | 3/2015 | Sif |
| 2015/0120890 A1 | 4/2015 | Ghai |
| 2015/0142958 A1 | 5/2015 | Tamura |
| 2015/0295750 A1 | 10/2015 | Blanco |

OTHER PUBLICATIONS

Somorovsky, Juraj, et al. "All your clouds are belong to us: security analysis of cloud management interfaces." Proceedings of the 3rd ACM workshop on Cloud computing security workshop. ACM, 2011.

Xu, Cheng-Zhong, Jia Rao, and Xiangping Bu. "URL: A unified reinforcement learning approach for autonomic cloud management." Journal of Parallel and Distributed Computing 72.2 (2012): 95-105.

Rochwerger, Benny, et al. "Reservoir-when one cloud is not enough." IEEE computer 44.3 (2011): 44-51.

Sotomayor, Borja, et al. "Virtual infrastructure management in private and hybrid clouds." Internet Computing, IEEE 13.5 (2009): 14-22.

Harmer, Terence, et al. "An application-centric model for cloud management." Services (Services-1), 2010 6th World Congress on. IEEE, 2010.

Stanek, Jan, Lukas Kencl, and Jiri Kuthan. "Characteristics of real open SIP-Server traffic." Passive and Active Measurement. Springer Berlin Heidelberg, 2013.

Kim, Jong Yul, and Henning Schulzrinne. "SipCloud: dynamically scalable SIP proxies in the cloud." Proceedings of the 5th International Conference on Principles, Systems and Applications of IP Telecommunications. ACM, 2011.

Scholler, Marcus, et al. "Resilient deployment of virtual network functions." Ultra Modern Telecommunications and Control Systems and Workshops (ICUMT), 2013 5th International Congress on. IEEE, 2013.

"Network Functions Virtualisation (NFV); Use Cases", ETSI, Oct. 2013.

"Virtualizing Network Services-the Telecom Cloud", Ericsson, Mar. 28, 2014.

"The Role of Layer 4-7 Services in Scaling Applications for the Cloud-Computing Data Center", Cisco, 2011.

(56) References Cited

OTHER PUBLICATIONS

Kächele, Steffen, et al. "Beyond IaaS and PaaS: An extended cloud taxonomy for computation, storage and networking." Proceedings of the 2013 IEEE/ACM 6th International Conference on Utility and Cloud Computing. IEEE Computer Society, 2013.
Ravindran, Ravishankar, et al. "Towards software defined ICN based edge-cloud services." Cloud Networking (CloudNet), 2013 IEEE 2nd International Conference on. IEEE, 2013.
"Software Defined Network and Network Functions Virtualization", Vikram Nair, 2014.
Manzalini, Antonio, and Roberto Saracco. "Software Networks at the Edge: A Shift of Paradigm." Future Networks and Services (SDN4FNS), IEEE, 2013.
Manzalini, Antonio, et al. "Clouds of virtual machines in edge networks." Communications Magazine, IEEE 51.7 (2013).
"The Real-Time Cloud", Ericsson, Feb. 2014.
U.S. Office Action dated Apr. 10, 2015 in U.S. Appl. No. 14/464,283.
U.S. Office Action dated Aug. 12, 2015 in U.S. Appl. No. 14/464,283.
U.S. Office Action dated Dec. 17, 2015 in U.S. Appl. No. 14/464,283.
U.S. Office Action dated Apr. 6, 2016 in U.S. Appl. No. 14/464,222.
U.S. Office Action dated May 18, 2016 in U.S. Appl. No. 14/464,261.
Basilier et al., "Virtualizing network services-the telecom cloud," Ericsson Review, Mar. 28, 2014, Ericsson.
White paper from ONUG Board of Directors, "Open Networking Challenges and Opportunities," Jul. 2014.
U.S. Office Action dated Jul. 12, 2016 in U.S. Appl. No. 14/464,283.

\* cited by examiner

VIRTUAL ZONES FOR OPEN SYSTEMS INTERCONNECTION LAYER 4 THROUGH LAYER 7 SERVICES IN A CLOUD COMPUTING SYSTEM

BACKGROUND

A current approach for augmenting capacity to constrain service failures to a region is to augment the capacity at data centers that are physically located within the region. This approach imposes limitations on the selection of data centers and becomes an issue when there are capacity constraints at data centers within the region.

SUMMARY

Concepts and technologies disclosed herein are directed to virtual zones for Open Systems Interconnection ("OSI") communication model layers 4-7 services in a cloud computing system. According to one aspect of the concepts and technologies disclosed herein, a cloud computing system can include a hardware resource and a virtual zone. The virtual zone can include one or more virtual network functions ("VNFs") that are executable by the hardware resource. The VNF(s) can support, at least in part, a service that operates within at least one of layers 4-7 of the OSI communication model.

In some embodiments, a system can detect new subscribers to the service within the virtual zone. The system also can determine that a capacity constraint exists within the virtual zone as a result of the new subscribers. The system also can home the new subscribers to a further virtual zone so that one or more further VNFs can provide the service to the new subscribers. The virtual zone can be expanded to support the new subscribers. The new subscribers can be rehomed to the virtual zone after the virtual zone is expanded.

In some embodiments, the virtual zone can provide failover protection. For example, if a VNF fails, a further VNF can be instantiated within the virtual zone and traffic associated with the service that is directed to the VNF can be rerouted to the further VNF to prevent the service from being interrupted.

In some embodiments, the virtual zone is one of a plurality of virtual zones. The plurality of virtual zones may operate in a plurality of localized regions. For example, the United States of America may be divided into northwest, southwest, central, northeast, and southeast regions, each of which includes one or more of the plurality of virtual zones.

In some embodiments, the hardware resource includes a compute resource such as processor. The hardware resource can additionally or alternatively include a memory resource. The hardware resource can additionally or alternatively include another hardware resource such as a network connectivity component.

In some embodiments, the hardware resource is in communication with a virtualization layer. The virtualization layer can include a virtual machine monitor. The virtual machine monitor can create and monitor the VNF. The VNF can include a virtual session border gateway, a virtual call session control function, or a virtual border gateway function. It should be understood, however, that the VNF can alternatively include any other network function that has been virtualized by the virtualization layer.

According to another aspect of the concepts and technologies disclosed herein, a method can include one or more operations to detect subscriber expansion in a virtual zone. The virtual zone can include a VNF that is executable by a hardware resource. The VNF can support, at least in part, a service that operates within one of layer 4 through layer 7 of the OSI communication model. The method also can include one or more operations to determine that a capacity constraint exists within the virtual zone as a result of the subscriber expansion. The method also can include one or more operations to home new subscribers associated with the subscriber expansion to a further virtual zone.

In some embodiments, the method also can include one or more operations to expand a capacity of the virtual zone to support the new subscribers. In these embodiments, the method also can include one or more operations to rehome the new subscribers to the virtual zone after expanding the capacity of the virtual zone to support the new subscribers.

According to yet another aspect of the concepts and technologies disclosed herein, a method can include one or more operations to define a plurality of virtual zones. The method also can include one or more operations to detect failure of a VNF operating within a virtual zone of the plurality of virtual zones. The method also can include one or more operations to direct traffic associated with a service that is provided, at least in part, by the virtual zone to a further virtual zone of the plurality of virtual zones.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to virtual zones for Open Systems Interconnection ("OSI")

communication model layers 4-7 services in a cloud computing system. While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multi-processor systems, distributed computing systems, microprocessor-based or programmable consumer electronics, minicomputers, mainframe computers, routers, switches, other computing devices described herein, and the like.

Figure 1:
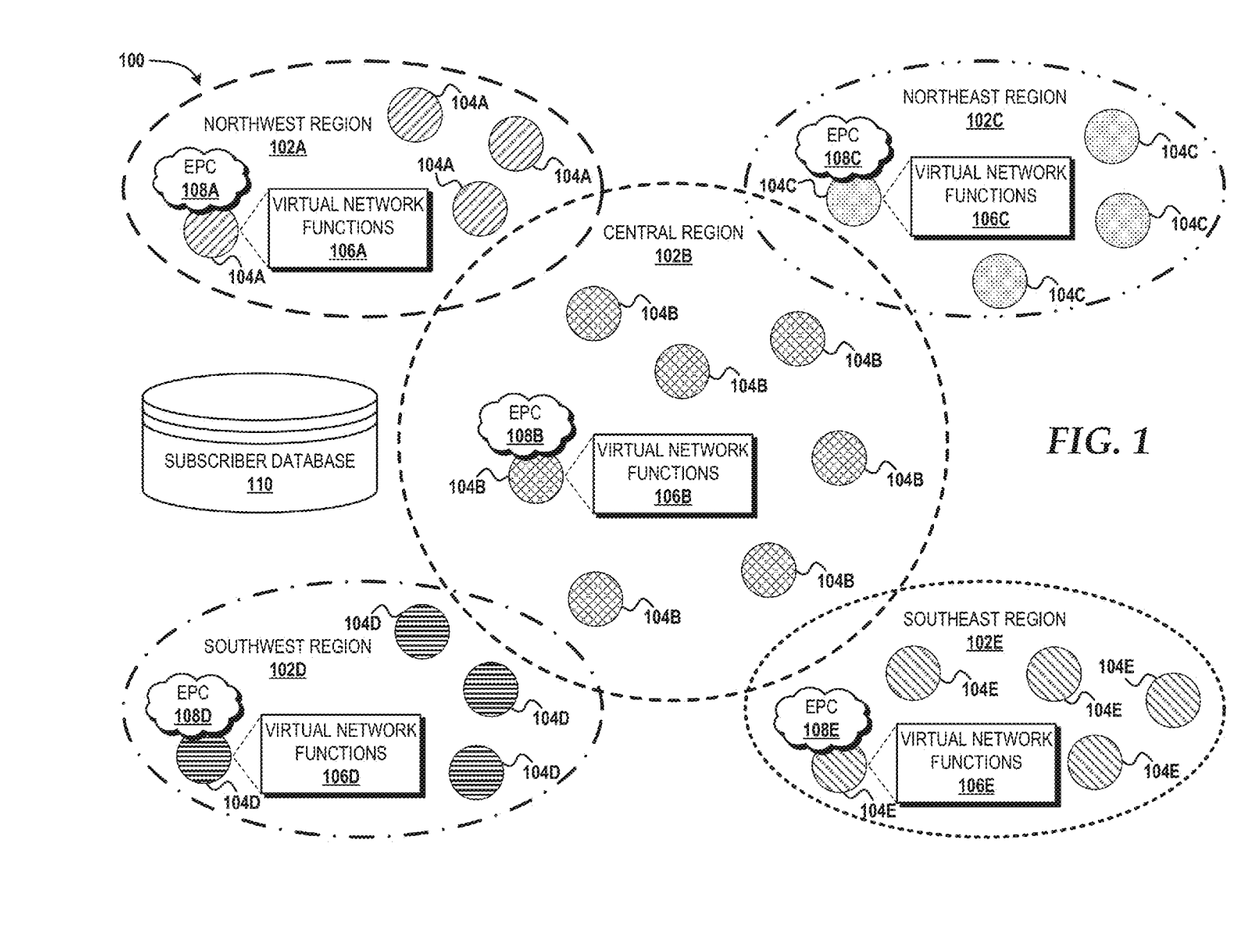
FIG. 1 is a diagram illustrating aspects of operating environment for implementing the various concepts and technologies disclosed herein.

Referring now to FIG. 1, a block diagram illustrating aspects of an operating environment 100 for implementing the various concepts and technologies disclosed herein will be described. The illustrated operating environment 100 includes a plurality of regions 102A-102E, including a northwest region 102A, a central region 102B, a northeast region 102C, a southwest region 102D, and a southeast region 102E (collectively referred to herein as "regions 102"). Although five regions are shown, any number of regions may be defined for a given implementation, and as such, the illustrated example should not be construed as being limiting in any way.

The northwest region 102A includes virtual zones 104A, the central region 102B includes virtual zones 104B, the northeast region 102C includes virtual zones 104C, the southwest region 102D includes virtual zones 104D, and the southeast region 102E includes virtual zones 104E (collectively referred to herein as "virtual zones 104"). As used herein, a "virtual zone" is a cloud computing zone that contains one or more virtual network functions ("VNFs") operating within a cloud computing system and that supports at least one OSI communication model layer 4-7 service for users from a localized region, such as one of the regions 102. Each of the regions 102 can include any number of virtual zones, and as such, the illustrated example should not be construed as being limiting in any way.

Each of the virtual zones 104A can include one or more VNFs 106A, each of the virtual zones 104B can include one or more VNFs 106B, each of the virtual zones 104C can include one or more VNFs 106C, each of the virtual zones 104D can include one or more VNFs 106D, and each of the virtual zones 104E can include one or more VNFs 106E (collectively referred to herein as "VNFs 106"). The VNFs 106 can be virtualizations of any network functions that perform, at least in part, one or more operations to support one or more OSI layer 4-7 services.

Layer 4 of the OSI communication model, also known as the Transport Layer, ensures end-to-end delivery of messages for both "connection-mode" data such as transfer control protocol ("TCP") connections and "connectionless-mode" data such as user datagram protocol ("UDP") datagrams. For both modes, the endpoints of communication are identified by port numbers such as TCP port 80 or UDP port 161. Layer 5 of the OSI communication model, also known as the Session Layer, provides services for coordinating communication between applications and synchronizing message delivery. For example, a protocol with suspend and resume or checkpoint and rollback capabilities includes session layer services such as, for example, International Telecommunication Union ("ITU") X.225, APPLETALK available from APPLE INC., and remote procedure call ("RPC"). Layer 6 of the OSI communication model, also known as the Presentation Layer, provides services for converting data from local format (i.e., abstract syntax) into a machine-independent format (i.e., transfer syntax). Some application protocols are defined in Abstract Syntax Notation One ("ASN.1") notation. ASN.1 defines a set of data structures mapped to encoding rules—for example, how an Integer should be encoded into a bit string to be transmitted to and decoded by a recipient using XML Encoding Rules (XER). Layer 7 of the OSI communication model, also known as the Application Layer, provides common services used by applications to establish, release, and abort communication with each other, as well as specific services. Most applications function within layer 7.

For subscriber expansion within a given one of the regions 102, new subscribers can be homed to virtual zones within the given region. If capacity constraints exist at a virtual zone within a region, the new subscribers can be homed to virtual zones that are located outside the region until capacity is again available at the virtual zone within the region. In this manner network capacity can be expanded while meeting operational requirements, including avoiding a nationwide or multi-region wide impact to users if a data center fails.

The VNFs 106A operating within the virtual zones 104A can be accessed via an evolved packet core ("EPC") 108A, the VNFs 106B operating within the virtual zones 104B can be accessed via an EPC 108B, the VNFs 106C operating within the virtual zones 104C can be accessed via an EPC 108C, the VNFs 106D operating within the virtual zones 104D can be accessed via an EPC 108D, and the VNFs 106E operating within the virtual zones 104E can be accessed via an EPC 108E (collectively referred to herein as "EPCs 108"). In the illustrated example, one virtual zone from each of the regions is shown having one or more VNFs and being in communication with an EPC. It should be understood, however, that this configuration is shown for ease of illustration, and each of the virtual zones operating within a given region can contain one or more VNFs and can be in communication with one or more EPCs. It also should be understood that although a single EPC is shown in each of the regions 102, multiple EPCs may be deployed within each of the regions 102, or alternatively, each EPC may provide access to multiple VNFs 106.

The EPCs 108 can be accessed by one or more devices (not shown) via one or more access networks (not shown) such as, for example, an evolved Universal Mobile Telecommunications System Terrestrial Radio Access Network ("E-UTRAN"). The devices can be mobile telephones, smartphones, mobile computers, tablet computers, or any other user equipment ("UE") that is configured to communicate with one or more of the EPCs 108 via the E-UTRAN and/or other access networks. As such, the devices can include at least one transceiver that is compatible with Long-Term Evolution ("LTE") to enable communications with the E-UTRAN. The devices can include one or more other transceivers to enable communications with other access networks including, but not limited to, access networks that operate in accordance with Global System for Mobile communications ("GSM"), Code Division Multiple Access ("CDMA") ONE, CDMA2000, and various other Third Generation Partnership Project ("3GPP"). Moreover, the other transceiver(s) may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like. The device also can include one or more transceivers to enable communications with WI-MAX and/or WI-FI networks.

The EPCs 108 can include one or more EPC functions. The EPC functions can include one or more serving gateways, one or more packet data network ("PDN") gateways, one or more mobility management entities ("MMEs"), and one or more home subscriber servers ("HSSs"). A serving gateway can transport Internet Protocol ("IP") data traffic between one or more devices and one or more external networks, including, an IP multimedia subsystem ("IMS") network. A serving gateway can connect E-UTRANs to the EPCs 108 to allow IP data communications between the devices and the EPCs 108. A serving gateway also can perform operations to facilitate handover among eNodeBs (not shown) within the E-UTRAN and between other LTE and 3GPP access networks. A serving gateway can be in communication with a PDN gateway.

A PDN gateway can interconnect one or more of the EPCs 108 and external IP networks (i.e., PDNs—not shown). A PDN gateway can route IP packets to and from the PDNs. A PDN gateway also can perform operations such as IP address/IP prefix allocation, policy control, and charging. In some implementations, a PDN gateway and a serving gateway are combined.

A MME can perform signal handling operation related to mobility and security for access to an E-UTRAN. An MME can track and page devices when the devices are in idle mode.

An HSS is a database that contains user/subscriber information. An HSS can perform operations to support mobility management, call and session setup, user authentication, and access authorization. In the illustrated example, a subscriber database 110 is provided as an example HSS and is accessible via the VNFs 106 operating across all of the regions 102.

The VNFs 106 can perform, at least in part, one or more operations to support one or more OSI layer 4-7 services, including, but not limited to, real-time services like voice over long-term evolution ("VoLTE") and video calls. The VNFs 106 can include, for example, one or more virtual session border controllers ("V-SBCs"), one or more virtual call session control functions ("V-CSCFs"), and/or one or more virtual border gateway functions ("V-BGFs") as will be described in greater detail below with reference to FIG. 2.

Figure 2:
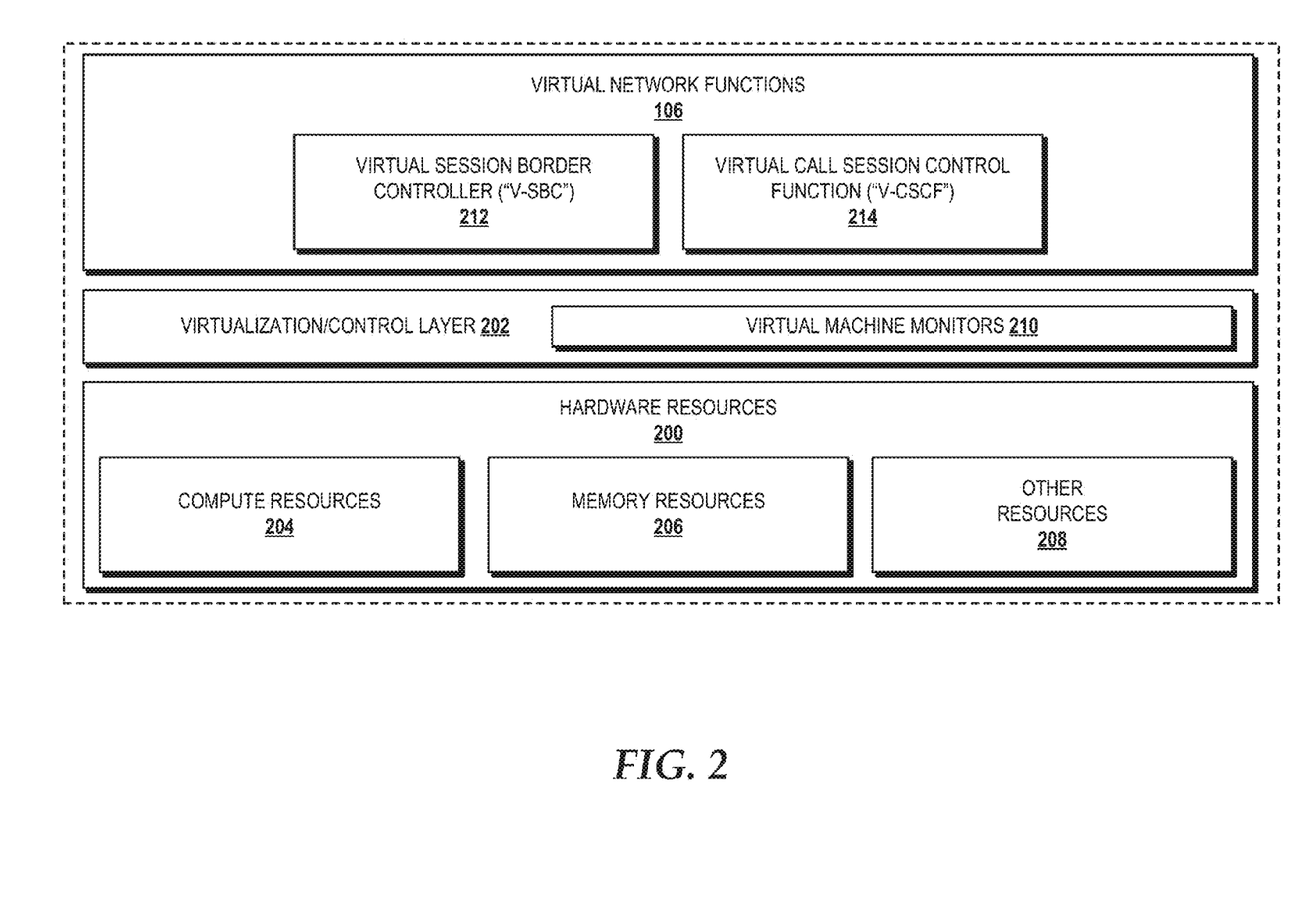
FIG. 2 is a block diagram illustrating aspects of hardware resources and virtual network functions in a cloud computing system, according to an illustrative embodiment.

Turning now to FIG. 2, aspects of hardware resources 200 that can be virtualized by a virtualization/control layer 202 to create the VNFs 106 will be described, according to an illustrative embodiment. The hardware resources 200 can include one or more compute resources 204, one or more memory resources 206, and one or more other resources 208. The hardware resources 200 can be co-located or distributed across a number of locations.

The compute resource(s) 204 can include one or more hardware components that perform computations to process data, and/or to execute computer-executable instructions of one or more application programs, operating systems, and/or other software. The compute resources 204 can include one or more central processing units ("CPUs") configured with one or more processing cores. The compute resources 204 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 204 can include one or more discrete GPUs. In some other embodiments, the compute resources 204 can include CPU and GPU components that are configured in accordance with a co-processing CPU/GPU computing model, wherein the sequential part of an application executes on the CPU and the computationally-intensive part is accelerated by the GPU. The compute resources 204 can include one or more system-on-chip ("SoC") components along with one or more other components, including, for example, one or more of the memory resources 206, and/or one or more of the other resources 208. In some embodiments, the compute resources 204 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 204 can be or can include one or more hardware components architected in accordance with an ARM architecture, available for license from ARM HOLDINGS of Cambridge, United Kingdom. Alternatively, the compute resources 204 can be or can include one or more hardware components architected in accordance with an x86 architecture, such an architecture available from INTEL CORPORATION of Mountain View, Calif., and others. Those skilled in the art will appreciate the implementation of the compute resources 204 can utilize various computation architectures, and as such, the compute resources 204 should not be construed as being limited to any particular computation architecture or combination of computation architectures, including those explicitly disclosed herein.

The memory resource(s) 206 can include one or more hardware components that perform storage operations, including temporary or permanent storage operations. In some embodiments, the memory resource(s) 206 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 204.

The other resource(s) 208 can include any other hardware resources that can be utilized by the compute resources(s) 204 and/or the memory resource(s) 206 to perform operations described herein. The other resource(s) 208 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources 200 can be virtualized by one or more virtual machine monitors 210, also known as "hypervisors," to create the VNFs 106. The virtual machine monitors 210 can be or can include software, firmware, and/or hardware that alone or in combination with other software, firmware, and/or hardware, creates the VNFs 106. The virtual machine monitors 210 can create additional VNFs 106 as needed to support service(s) for new users in a given virtual zone.

In the illustrated example, the VNFs 106 include one or more virtual session border controllers ("V-SBCs") 212 and one or more virtual call session control functions ("V-CSCFs") 214. It should be understood that these functions are provided as illustrative examples of the VNFs 106 that can be instantiated by the virtual machine monitors 210, and as such, should not be construed as limiting in any way.

The V-SBC(s) 212 can inspect signaling messages and can instruct one or more hardware or software firewalls to open and close as needed for signaling communications. The V-SBC(s) 212 can perform IPV4 to/from IPV6 address translation. The V-SBC(s) 212 can perform network address and port translation ("NAPT") in both directions. The V-SBC(s) 212 can perform traversal network address translation ("NAT") and firewall devices. The V-SBC(s) 212 can perform can perform policy enforcement. The V-SBC(s) 212 can perform QoS bandwidth allocation and call admission control ("CAC") functions. The V-SBC(s) 212 can perform policing and marking functions. The V-SBC(s) 212 can protect from denial of service ("DOS") and other forms of attack. It should be understood that the V-SBC(s) 212 can perform additional operations known to those skilled in the art, and as such, the operations described above should not be construed as being limiting in any way.

The V-CSCF(s) 214 can perform operations regarding session establishment and teardown, user authentication, security, and Quality of Service ("QoS") for IP-based communications and services. The V-CSCF(s) 214 can be or can include virtual abstractions of one or more physical CSCFs, including, for example, a proxy-CSCF ("P-CSCF"), an interrogating-CSCF ("I-CSCF"), a serving-CSCF ("S-CSCF"), or a combination thereof.

A P-CSCF can provide a first point of contact between devices (not shown) and an IMS network. A P-CSCF can validate SIP messages with exchanged between the devices and the IMS network according to SIP standards. A P-CSCF can provide security for SIP messages exchanged between the devices and the IMS network using IPsec and transport layer security ("TLS"), for example. A P-CSCF can authenticate the identity of devices. A P-CSCF can compress SIP messages to ensure efficient transmission over narrowband channels and to conserve bandwidth. The P-CSCF can provide policy enforcement functions. A P-CSCF can generate charging information for sessions. A P-CSCF can perform other operations as will be appreciated by those skilled in the art. It should be understood that a P-CSCF of the V-CSCFs 214 can perform additional operations known to those skilled in the art, and as such, the operations described above should not be construed as being limiting in any way.

An I-CSCF can provide an entry point for all connections related to users, such as a user associated with the device 102. An I-CSCF can identify the S-SCSF for a given user performing SIP registration and can forward the registration request to the appropriate S-CSCF. An I-CSCF can implement a Diameter (RFC 3588) interface to an HSS, and can query the HSS to retrieve the address of the S-CSCF for devices to perform SIP registration. An I-CSCF can forward SIP message requests and responses to the S-CSCF. An I-CSCF can encrypt SIP messages or portions thereof. It should be understood that an I-CSCF of the V-CSCFs 214 can perform additional operations known to those skilled in the art, and as such, the operations described above should not be construed as being limiting in any way.

An S-CSCF can provide signaling functions for the IMS network. An S-CSCF can perform location registration, user authentication, and call/session routing and processing operations. An S-CSCF can support Diameter interfaces to the HSS over which to download authentication information and user profile of registering devices from the HSS for authentication. SIP signaling to and from devices can traverse the S-CSCF that is allocated during device registration. It should be understood that an S-CSCF of the V-CSCFs 214 can perform additional operations known to those skilled in the art, and as such, the operations described above should not be construed as being limiting in any way.

Figure 3:
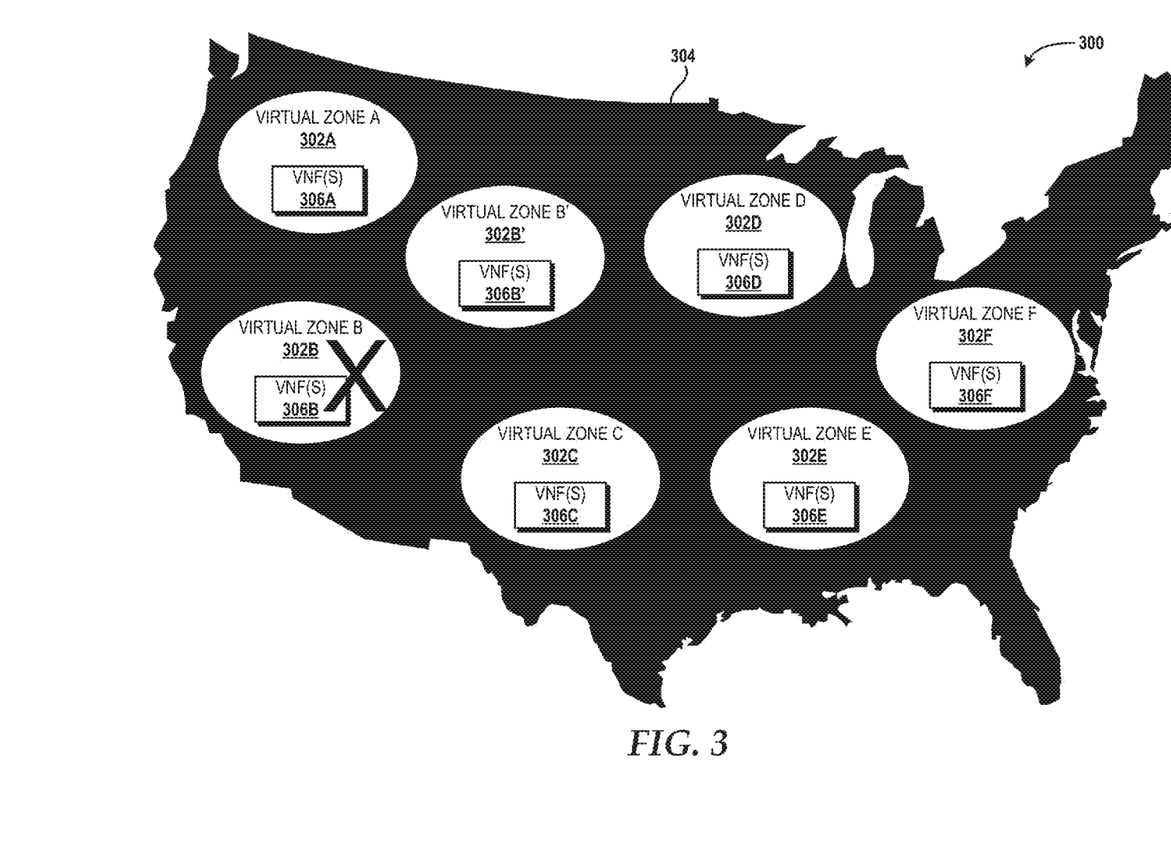
FIG. 3 is a diagram illustrating aspects of virtual zones distributed across a map of the United States of America, according to an illustrative embodiment.

Turning now to FIG. 3, a diagram 300 illustrating aspects of virtual zones 302A-302F distributed across a map 304 of the United States of America will be described, according to an illustrative embodiment. In particular, the map 304 illustrates virtual zones A-F 302A-302F, each having one or more VNFs 306A-306F, respectively. The VNFs 306A-306F can be configured like or similar to the VNFs 106 described above with reference to FIGS. 1 and 2. In the illustrated example, one or more of the VNFs 306B operating within the virtual zone B 302B have failed resulting in an outage within the virtual zone B 302B. In response, traffic associated with one or more services provided, at least in part, by the virtual zone B 302B is redirected to a new virtual zone, virtual zone B' 302B', which include one or more VNFs 306B' that is/are instantiated in response to the failure of the virtual zone B 302B. In this manner, the VNF(s) 306B that failed in the virtual zone B 302B can be repaired without disruption of service to subscribers within the virtual zone B 302B.

Figure 4:
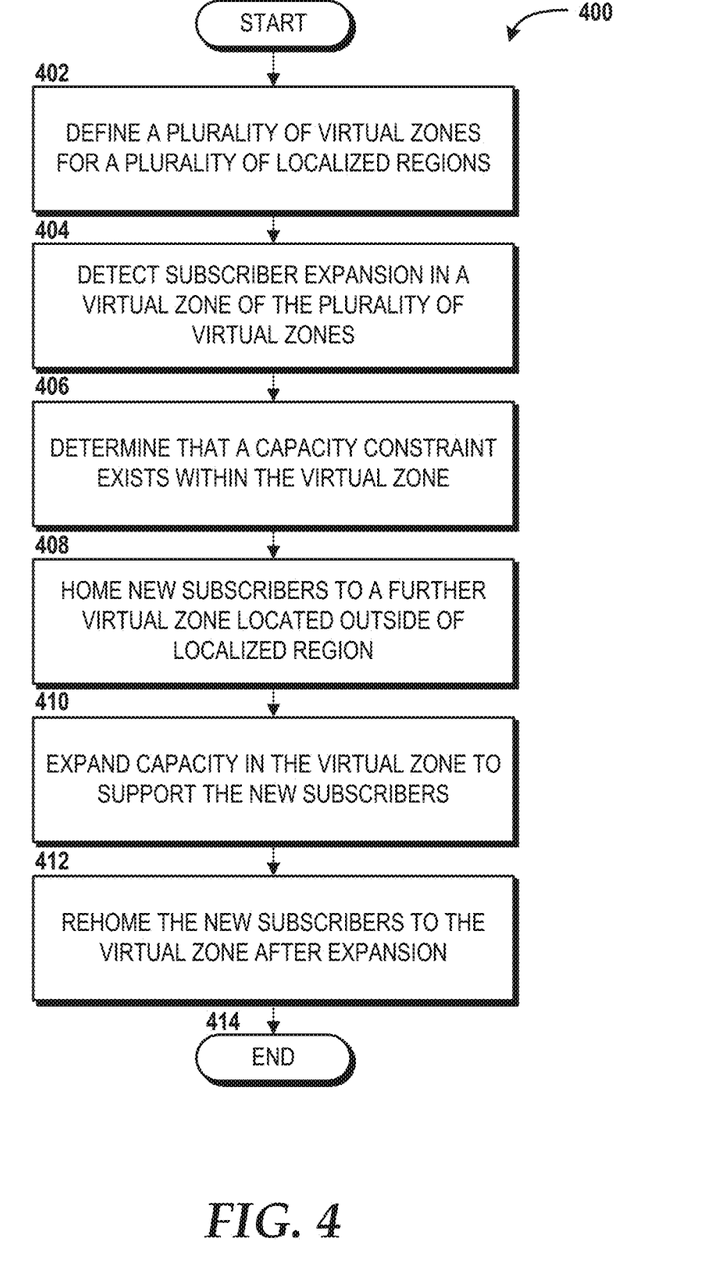
FIG. 4 is a flow diagram illustrating aspects of a method for rehoming subscribers of Open Systems Interconnection ("OSI") communication model layer 4 through layer 7 services in a cloud computing system, according to an illustrative embodiment.

Turning now to FIG. 4, a flow diagram illustrating aspects of a method 400 for rehoming subscribers of OSI communication model layer 4 through layer 7 services in a cloud computing system will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more other computing systems, devices, engines, or components disclosed herein to perform operations. It should be understood that the performance of one or more operations may include operations executed by one or more virtual processors at the instruction of one or more of the aforementioned hardware processors.

The method 400 will be described with reference to FIG. 4 and further reference to FIG. 1. The method 400 begins at operation 402, where a plurality of virtual zones, such as the virtual zones 104 (best shown in FIG. 1), are defined for a plurality of localized regions, such as the regions 102 (also best shown in FIG. 1). From operation 402, the method 400 proceeds to operation 404, where a VNF, such as one of the VNFs 106, detects subscriber expansion in a virtual zone of the plurality of virtual zones. From operation 404, the method 400 proceeds to operation 406, where the VNF determines that a capacity constraint exists within the virtual zone in which subscriber expansion was detected.

From operation 406, the method 400 proceeds to operation 408, where new subscribers are homed to a further virtual zone located outside of the virtual region in which the virtual zone is located. From operation 408, the method 400 proceeds to operation 410, where capacity in the virtual zone is expanded to support the new subscribers. From operation 410, the method 400 proceeds to operation 412, where the new subscribers are rehomed to the virtual zone after expansion. In this manner, service capacity can be increased without affecting service performance in response to capacity constraint conditions. Moreover, similar methodology may be used to support rehoming of subscriber in the event of a failure of one or more VNFs operating within a given virtual zone, such as provided in the example shown in FIG. 3.

From operation 412, the method 400 proceeds to operation 414. The method 400 ends at operation 414.

Figure 5:
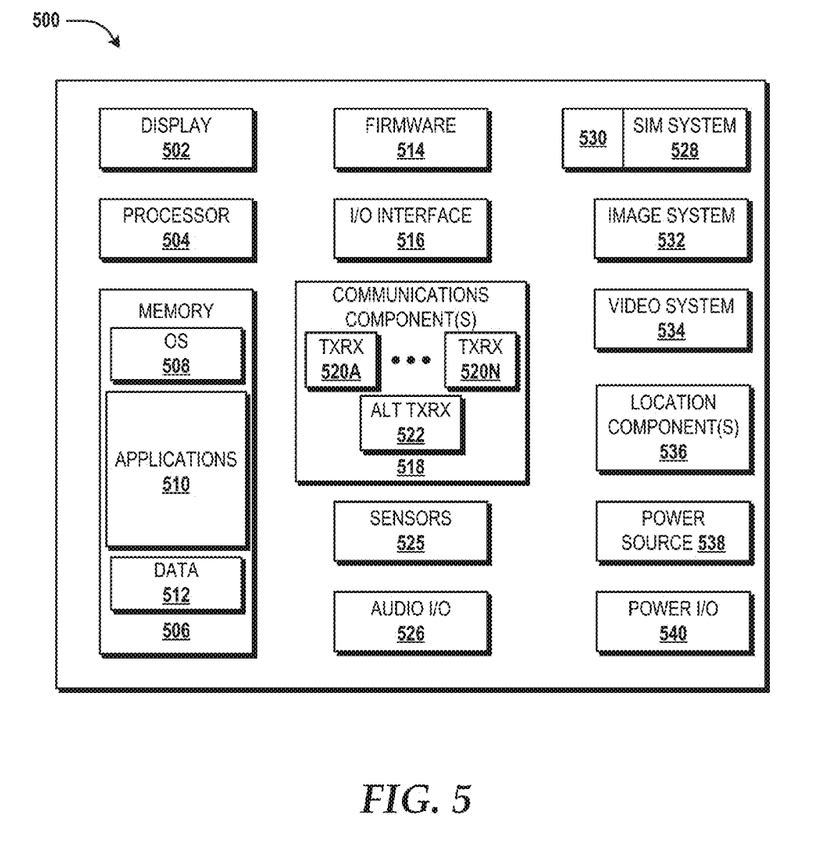
FIG. 5 is a block diagram illustrating an example mobile device capable of implementing aspects of the embodiments disclosed herein.

Turning now to FIG. 5, an illustrative mobile device 500 and components thereof will be described, according to one embodiment. Devices operating within the virtual zones described herein may be configured like or have an architecture similar to the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. According to various embodiments, the other applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1555 ("FIREWIRE") port, a serial port, a parallel port, an Ethernet (RJ55) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 525. The sensors 525 can include temperature sensors, light sensors, air quality sensors, movement sensors, orientation sensors, noise sensors, proximity sensors, or the like. As such, it should be understood that the sensors 525 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 525 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
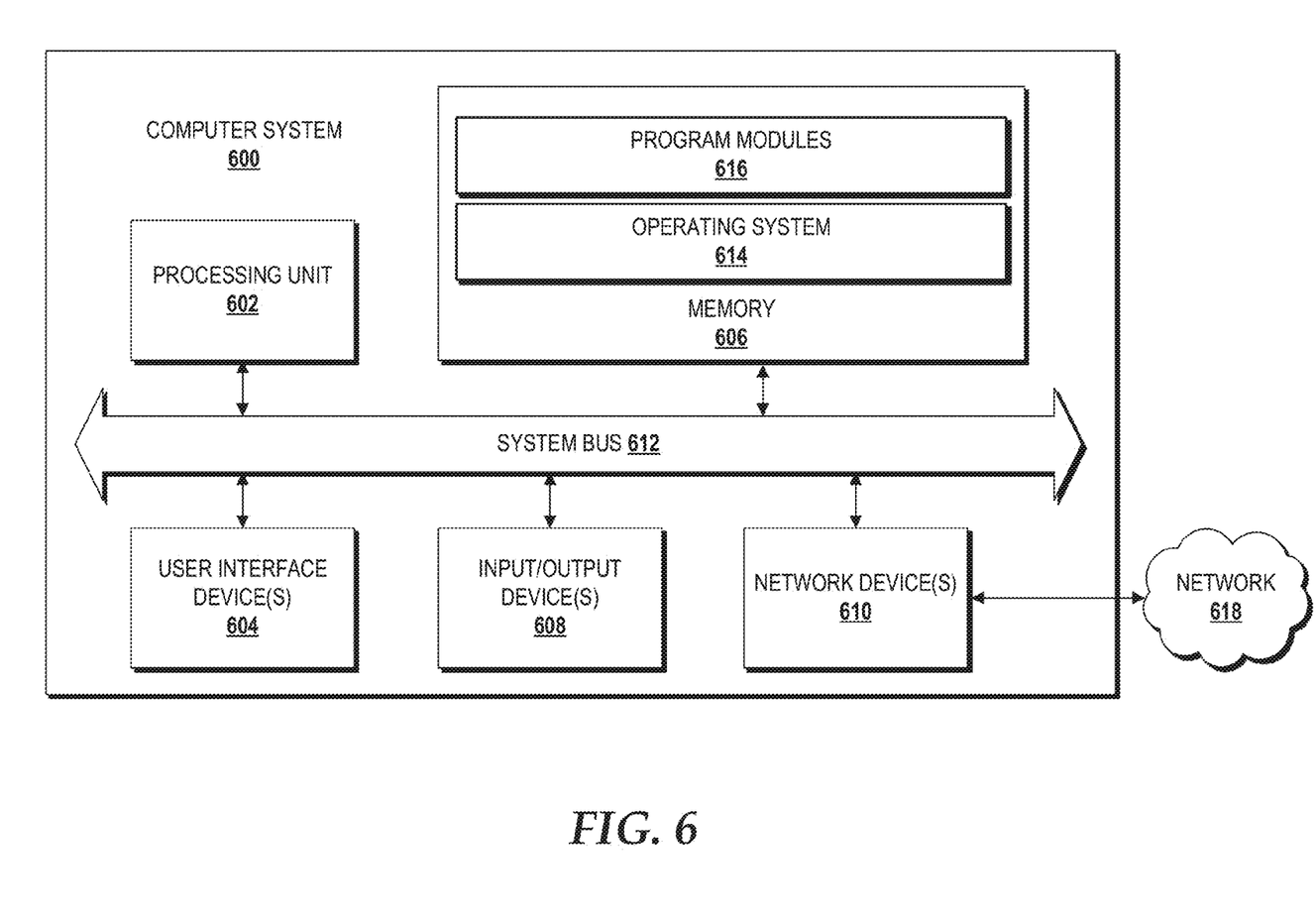
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, the hardware resources 200 (illustrated in FIG. 2) includes one or more computers that are configured like the architecture of the computer system 600. The computer system 600 may provide at least a portion of the compute resources 204, the memory resources 206, and/or the other resources 208. It should be understood, however, that modification to the architecture may be made to facilitate certain interactions among elements described herein.

The computer system 600 includes a processing unit 602, a memory 606, one or more user interface devices 604, one or more input/output ("I/O") devices 608, and one or more network devices 610, each of which is operatively connected to a system bus 612. The bus 612 enables bi-directional communication between the processing unit 602, the memory 606, the user interface devices 604, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 204 can include one or more processing units 602.

The memory 606 communicates with the processing unit 602 via the system bus 612. In some embodiments, the memory 606 is operatively connected to a memory controller (not shown) that enables communication with the processing unit 602 via the system bus 612. The memory resources 206 can include one or more instances of the memory 606. The illustrated memory 606 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 604 may include one or more devices with which a user accesses the computer system 600. The user interface devices 604 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 may be or may include any other network described herein.

Figure 7:
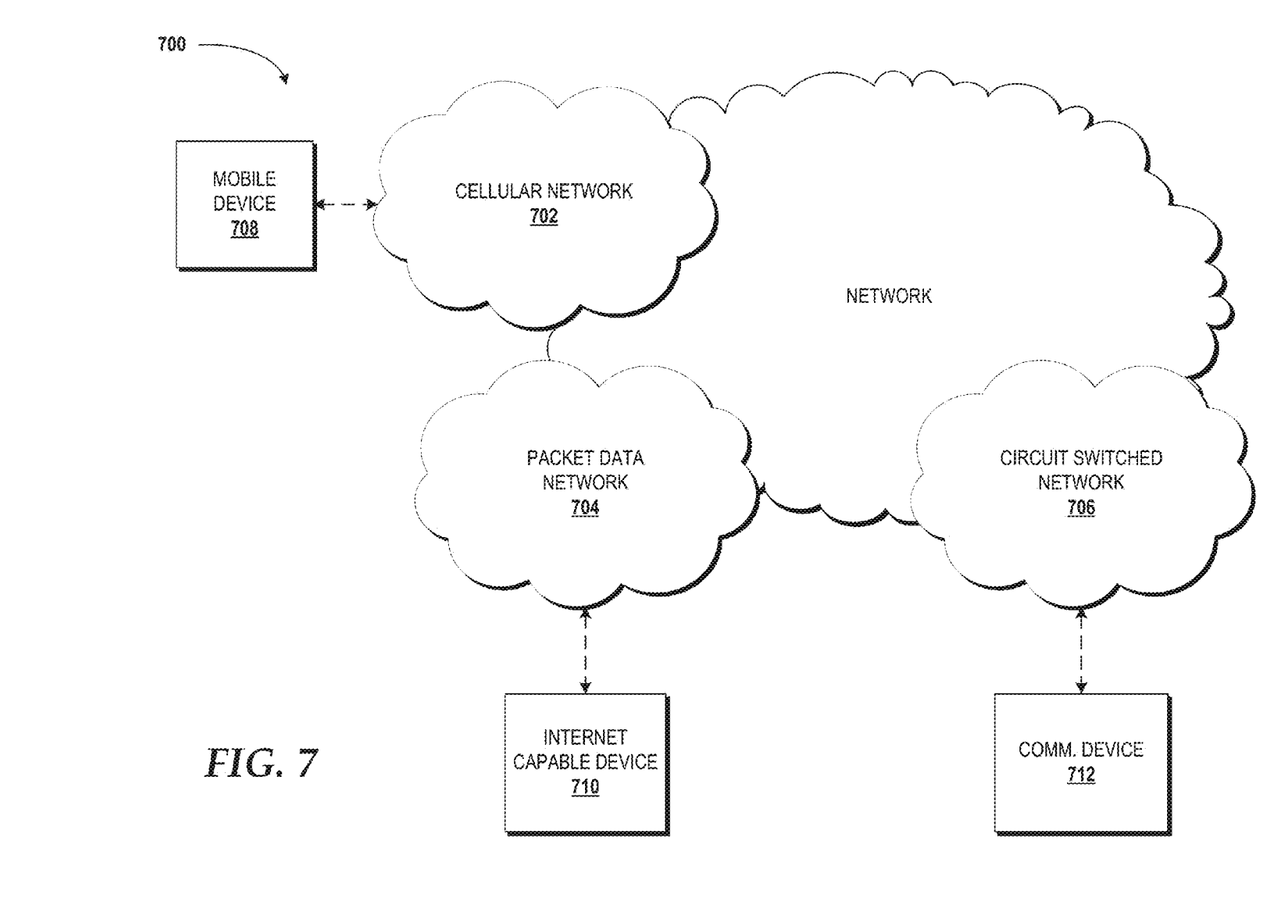
FIG. 7 is a diagram illustrating a network, according to an illustrative embodiment.

Turning now to FIG. 7, details of a network 700 are illustrated, according to an illustrative embodiment. The network 700 can include the virtual zones 104, the EPCs 108, and other network elements described above with reference to FIG. 1. The illustrated network 700 includes a cellular network 702, a packet data network 704, for example, the Internet, and a circuit switched network 706, for example, a PSTN. The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a POTS. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, the unmanaged TDM device, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Based on the foregoing, it should be appreciated that concepts and technologies directed to virtual zones for OSI communication model layers 4-7 services in a cloud computing system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A cloud computing system comprising:
   a plurality of compute resources; and
   a plurality of memory resources, wherein:
   a first portion of the plurality of memory resources comprises virtual machine monitor instructions that, when executed by a first portion of the plurality of compute resources, cause the first portion of the plurality of compute resources to perform first operations comprising instantiating a plurality of virtual network functions, each of the plurality of virtual network functions comprising network function instructions,
   a second portion of the plurality of memory resources comprises the network function instructions that, when executed by a second portion of the plurality of compute resources, cause the second portion of the plurality of compute resources to perform second operations comprising providing, at least in part, a telecommunication service, and
   a third portion of the plurality of memory resources comprises virtual zone instructions that, when executed by a third portion of the plurality of compute resources, cause the third portion of the plurality of compute resources to perform third operations comprising logically grouping the plurality of virtual network functions into a plurality of virtual zones, each of the plurality of virtual zones providing, via a portion of the plurality of virtual network functions, at least in part, the telecommunication service within a geographical region independent of a physical location of the plurality of compute resources.

2. The cloud computing system of claim 1, wherein a fourth portion of the plurality of memory resources comprises capacity instructions that, when executed by a fourth portion of the plurality of compute resources, causes the fourth portion of the plurality of compute resources to perform fourth operations comprising:
   detecting new subscribers to the telecommunication service within a first virtual zone of the plurality of virtual zones; and
   determining that a capacity constraint exists within the first virtual zone as a result of the new subscribers.

3. The cloud computing system of claim 2, wherein the fourth operations further comprise: homing the new subscribers to a second virtual zone of the plurality of virtual zones.

4. The cloud computing system of claim 3, wherein the fourth operations further comprise:
   expanding capacity of the first virtual zone to support the new subscribers; and
   rehoming the new subscribers to the first virtual zone after the capacity of the first virtual zone is expanded to support the new subscribers.

5. The cloud computing system of claim 2, wherein the fourth operations further comprise:
   instantiating a further virtual network function after a first virtual network function of the plurality of virtual network functions fails to prevent the telecommunication service from being interrupted.

6. The cloud computing system of claim 1, wherein the plurality of virtual zones operate within a plurality of localized regions.

7. The cloud computing system of claim 6, further comprising a plurality of other hardware resources.

8. The cloud computing system of claim 7, wherein the plurality of compute resources, the plurality of memory resources, and the plurality of other hardware resources are in communication with a virtualization layer, the virtualization layer comprising a virtual machine monitor that comprises the virtual machine monitor instructions that, when executed by the first portion of the plurality of compute resources instantiates and monitors the plurality of virtual network functions.

9. The cloud computing system of claim 8, wherein the plurality of virtual network functions comprise a virtual session border controller and a virtual call session control function.

10. A method comprising:
    detecting, by a computing system comprising a processor, subscriber expansion in a virtual zone, the virtual zone comprising a virtual network function that is executable by a hardware resource and that supports, at least in part, a service that operates within at least one of layer 4 through layer 7 of an open systems interconnection communication model;
    determining, by the computing system, that a capacity constraint exists within the virtual zone as a result of the subscriber expansion; and
    homing, by the computing system, new subscribers associated with the subscriber expansion to a further virtual zone.

11. The method of claim 10, further comprising:
    expanding a capacity of the virtual zone to support the new subscribers; and
    rehoming the new subscribers to the virtual zone after expanding the capacity of the virtual zone to support the new subscribers.

12. The method of claim 11, wherein expanding the capacity of the virtual zone to support the new subscribers comprises instantiating a further virtual network function within the virtual zone.

13. The method of claim 11, wherein expanding the capacity of the virtual zone to support the new subscribers comprises expanding the capacity of the virtual network function to support the new subscribers.

14. The method of claim 10, wherein the virtual zone is one of a plurality of virtual zones operating within a plurality of localized regions.

15. The method of claim 14, wherein the hardware resource comprises a compute resource, a memory resource, or another hardware resource.

16. The method of claim 15, wherein the hardware resource is in communication with a virtualization layer comprising a virtual machine monitor that creates and monitors the virtual network function.

17. The method of claim 16, wherein the virtual network function comprises a virtual session border controller and a virtual call session control function.

18. A method comprising:
    defining a plurality of virtual zones;
    detecting, by a hardware resource, a failure of a virtual network function operating within a virtual zone of the plurality of virtual zones; and
    directing, via the hardware resource, traffic associated with a service provided, at least in part, by the virtual zone to a further virtual zone of the plurality of virtual zones.

19. The method of claim 18, wherein the virtual network function comprises a virtual session border controller, a virtual call session control function, a virtual border controller function, or any function that provides, at least in part, the service.

20. The method of claim 19, wherein the service operates within one of layer 4 through layer 7 of an open systems interconnection communication model.

* * * * *